US010613676B2

(12) United States Patent
Westhues et al.

(10) Patent No.: US 10,613,676 B2
(45) Date of Patent: Apr. 7, 2020

(54) NON-UNIFORM CODE CONSTELLATIONS IN ELECTROSTATIC COMMUNICATION

(71) Applicant: Microsoft Technology Licensing, LLC, Redmond, WA (US)

(72) Inventors: Jonathan Westhues, Portland, OR (US); Tianzhu Qiao, Portland, OR (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 186 days.

(21) Appl. No.: 15/614,413

(22) Filed: Jun. 5, 2017

(65) Prior Publication Data

US 2018/0129340 A1    May 10, 2018

Related U.S. Application Data

(60) Provisional application No. 62/417,990, filed on Nov. 4, 2016.

(51) Int. Cl.
*G06F 3/041* (2006.01)
*G06F 3/0354* (2013.01)
(Continued)

(52) U.S. Cl.
CPC ............ *G06F 3/0416* (2013.01); *G06F 3/038* (2013.01); *G06F 3/03545* (2013.01); *G06F 3/044* (2013.01)

(58) Field of Classification Search
CPC ........ G06F 3/0416; G06F 3/044; G06F 3/038; G06F 3/03545
See application file for complete search history.

(56) References Cited

U.S. PATENT DOCUMENTS

| 5,247,138 A | 9/1993 | Landmeier |
| 6,598,203 B1 | 7/2003 | Tang |

(Continued)

FOREIGN PATENT DOCUMENTS

| EP | 2264568 A2 | 12/2010 | |
| EP | 2354909 A2 * | 8/2011 | ............. G06F 3/046 |

(Continued)

OTHER PUBLICATIONS

"International Search Report and Written Opinion Issued in PCT Application No. PCT/US2017/058917", dated Feb. 8, 2018, 11 Pages.

(Continued)

*Primary Examiner* — Grant Sitta
(74) *Attorney, Agent, or Firm* — Alleman Hall Creasman & Tuttle LLP

(57) ABSTRACT

A touch-sensitive device includes a touch sensor including a plurality of electrodes and receive circuitry configured to interpret a response on one or more electrodes of the plurality of electrodes based on stylus waveforms being driven on a stylus electrode of an active stylus. The touch-sensitive device is configured to correlate the stylus waveforms with one or more reference waveforms to produce correlation magnitudes; The touch-sensitive device is further configured to map each correlation magnitude to a demodulation symbol selected from a plurality of demodulation symbols of a one-dimensional, non-uniform constellation. Each demodulation symbol encodes multiple data bits. The touch-sensitive device is further configured to decode the mapped demodulation symbols to determine a plurality of data bits of stylus information of the active stylus.

20 Claims, 6 Drawing Sheets

(51) Int. Cl.
*G06F 3/038* (2013.01)
*G06F 3/044* (2006.01)

(56) References Cited

U.S. PATENT DOCUMENTS

| | | | | |
|---|---|---|---|---|
| 9,213,424 | B1* | 12/2015 | Dunn | G06F 3/03545 |
| 9,329,703 | B2* | 5/2016 | Falkenburg | G06F 3/03545 |
| 9,625,507 | B2* | 4/2017 | Erdogan | G01R 27/2605 |
| 10,180,736 | B2* | 1/2019 | Krumpelman | G06F 3/03545 |
| 10,234,966 | B1* | 3/2019 | Westhues | G06F 3/03545 |
| 2004/0035935 | A1* | 2/2004 | Takahashi | G06K 19/06037 235/462.09 |
| 2004/0056849 | A1* | 3/2004 | Lohbihler | G06F 3/03545 345/173 |
| 2009/0177954 | A1* | 7/2009 | Takahashi | H04L 1/0045 714/819 |
| 2010/0051356 | A1 | 3/2010 | Stern et al. | |
| 2010/0155153 | A1 | 6/2010 | Zachut | |
| 2010/0321338 | A1 | 12/2010 | Ely | |
| 2011/0231728 | A1* | 9/2011 | Gaur | H03M 13/25 714/752 |
| 2013/0300719 | A1* | 11/2013 | Wang | G06F 3/046 345/179 |
| 2014/0002422 | A1* | 1/2014 | Stern | G06F 3/03545 345/179 |
| 2014/0028635 | A1* | 1/2014 | Krah | G06F 3/041 345/179 |
| 2014/0285469 | A1 | 9/2014 | Wright et al. | |
| 2015/0121176 | A1* | 4/2015 | Myung | H04L 1/0041 714/776 |
| 2015/0236720 | A1* | 8/2015 | Park | H03M 13/116 714/752 |
| 2015/0346890 | A1 | 12/2015 | Zachut | |
| 2015/0363035 | A1* | 12/2015 | Hinckley | G06F 3/0383 345/173 |
| 2016/0124528 | A1* | 5/2016 | Feng | G06F 3/03545 345/179 |
| 2016/0132137 | A1 | 5/2016 | Westhues et al. | |
| 2016/0195943 | A1 | 7/2016 | Gur et al. | |
| 2016/0344499 | A1* | 11/2016 | Myung | H04L 1/009 |

FOREIGN PATENT DOCUMENTS

| | | |
|---|---|---|
| EP | 2354909 A2 | 8/2011 |
| EP | 2372510 A2 | 10/2011 |
| WO | 2016094151 A1 | 6/2016 |

OTHER PUBLICATIONS

Souto, et al., "Non-Uniform Constellations for Broadcasting and Multicasting Services in WCDMA Systems", In Proceedings of IEEE 14th IST Mobile & Wireless Communications Summit, Jun. 2005, 5 pages.

Fragouli, et al., "Turbo Codes with Non-Uniform Constellations", In Proceedings of IEEE International Conference on Communications, Jun. 11, 2001, pp. 70-73.

* cited by examiner ially to communication.

NON-UNIFORM CODE CONSTELLATIONS IN ELECTROSTATIC COMMUNICATION

CROSS REFERENCE TO RELATED APPLICATIONS

This application claims priority to U.S. Provisional Patent Application No. 62/417,990, filed Nov. 4, 2016, the entirety of which is hereby incorporated herein by reference.

BACKGROUND

Many touch-sensitive computing devices employ an active stylus to enhance touch interaction. Determining the position of the stylus and enabling other functionality in such systems may be provided via electrostatic communication, i.e., between the stylus and a capacitive touch sensor of the host computing device. The host computing device and its various components (display, capacitive touch sensor, etc.) will at times be collectively referred to herein as a "digitizer."

DETAILED DESCRIPTION

Figure 1:
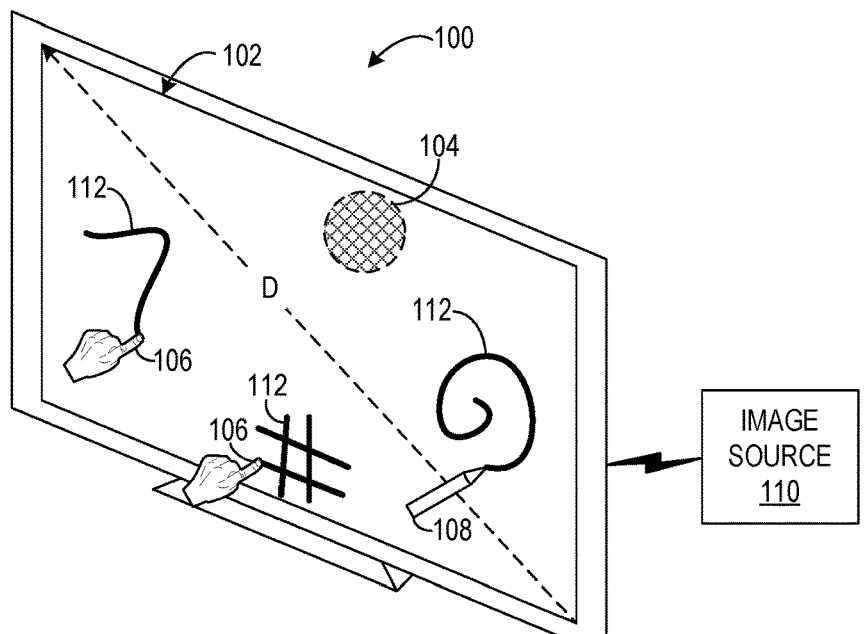
FIG. 1 shows an example display device including a touch sensor receiving touch inputs from a user's body and an active stylus.

As indicated above, many touch interactive computing devices employ an active stylus to enhance functionality. Position sensing and other operations in these devices is enabled via electrostatic interaction between the stylus and digitizer. For example, the stylus may include a tip electrode that interacts with one or more electrodes (e.g., rows/columns or discrete x/y-located self-capacitance sensels) of a touch sensor incorporated within the digitizer. Applying an excitation waveform on the stylus tip electrode influences electrical behavior at the digitizer (e.g., charge accumulation, capacitance, voltage/current, etc. on one or more of the touch sensor electrodes). Similarly, excitation of digitizer electrodes influences conditions on the stylus electrodes.

Electrostatic drive/receive activity is used to conduct capacitance measurements, via monitoring of conditions at the receiving, influenced, electrodes of the touch sensor and/or stylus. Capacitance measurements may be made in receive circuitry attached to the receiving electrodes of the stylus/digitizer and may be achieved via one or more correlation operations. For example, a received signal may be correlated with a reference signal to determine whether the received signal corresponds to what is known to occur in the presence of finger touch.

In typical correlation-based digitizers, one-dimensional correlators are implemented in the receive circuitry to perform correlation operations. One-dimensional correlators may be configured to correlate one characteristic or aspect of a received signal with a reference signal. For example, a received signal (i.e., response sensed on a receiving electrode) may be correlated with a reference signal to produce a correlation magnitude that is used to determine a position of a finger touch, among other operations. Such correlators output three states to the digitizer: (1) a 'positive' correlation magnitude between the stylus waveform and the reference waveform, (2) a 'negative' correlation magnitude between the stylus waveform and the reference waveform based on an 180° phase shift between the waveforms, and (3) no state/signal—in this case, the output from the correlator is zero, i.e., it is the same case as when the stylus is not present. Output magnitudes may be used in some cases to convey additional information. One-dimensional correlators may be used in a digitizer in favor of multi-dimensional correlators in order to reduce a production cost of the digitizer. However, the above constraints greatly limit the modulation schemes that can be used to electrostatically send data (e.g., stylus information) from the active stylus to the digitizer.

Within the context of correlation-based electrostatic interaction, high frame rates are desirable at least for accurately determining the location of finger and stylus input. However, high frame/fresh rates may limit the size of each communication frame thereby limiting the amount of data that can be included in each communication frame. As used herein, a communication frame is a data structure including a plurality of slots, some of which are dedicated to demodulation symbols that encode stylus or other information that is transmitted between a stylus and a digitizer.

Accordingly, the present description contemplates a signal modulation scheme that can be used to sustain high frame rates while also allowing for a greater amount of data to be encoded within each communication frame. According to the signal modulation scheme, one or more stylus waveforms from an active stylus induce outputs at receiving electrodes that are correlated with one or more reference waveforms of a digitizer to produce correlation magnitudes. Each correlation magnitude is mapped to a demodulation symbol selected from a plurality of demodulation symbols of a one-dimensional, non-uniform constellation. In the constellation, each demodulation symbol encodes multiple data bits. The mappings are processed to determine a plurality of data bits of stylus information of the active stylus.

By encoding multiple data bits into each demodulation symbol, data rates of each communication frame may be increased relative to constellations that encode a single bit per symbol. In this way, the signal modulation scheme provides communication frames that have high data rates and can be sent at a high frame/refresh rate.

Furthermore, the contemplated signal modulation scheme may be beneficially employed with a digitizer that includes one-dimensional correlators, because all the demodulation symbols of the one-dimensional, non-uniform constellation can be mapped to correlation magnitudes output by the one-dimensional correlators. Other modulation schemes that use multi-dimensional constellations often include demodulation symbols associated with multiple waveform properties constellated in multiple dimensions, and therefore cannot be mapped to the output of one-dimensional correlators.

As such, signal modulation schemes that use multi-dimensional symbols may be incompatible with such digitizers.

FIG. 1 shows a touch-sensitive display system 100 including a display device 102 and touch sensor 104 constituting, alone or in combination with associated components (e.g., a processor), a digitizer. In some examples, display device 102 may be a large format display with a diagonal dimension D greater than 1 meter, though the display may assume any suitable size. Display device 102 may be configured to sense one or more sources of input, such as touch input imparted via fingers 106 and/or input supplied by an input device 108, shown in FIG. 1 as a stylus. The active stylus may include an electrode configured to transmit a waveform that is received by the touch sensor 104 to determine a position of the active stylus. The fingers 106 and input device 108 are provided as non-limiting examples, and any other suitable source of input may be used in connection with display device 102.

Display device 102 may be configured to receive input from styluses and fingers in contact with the display 102 and/or "hovering" over the display surface. "Touch input" as used herein refers to both finger and non-finger (e.g., stylus) input, and to input supplied by input devices both in contact with, and spaced away from but proximate to, display device 102. In some examples, display device 102 may be configured to receive input from two or more sources simultaneously, in which case the display may be referred to as a multi-touch display.

Display device 102 may be operatively coupled to an image source 110, which may be, for example, a computing device external to, or housed within, the display. Image source 110 may receive input from display device 102, process the input, and in response generate appropriate graphical output 112 for the display. In this way, display device 102 may provide a natural paradigm for interacting with a computing device that can respond appropriately to touch input. Details regarding an example computing device are described below with reference to FIG. 10.

Figure 2:
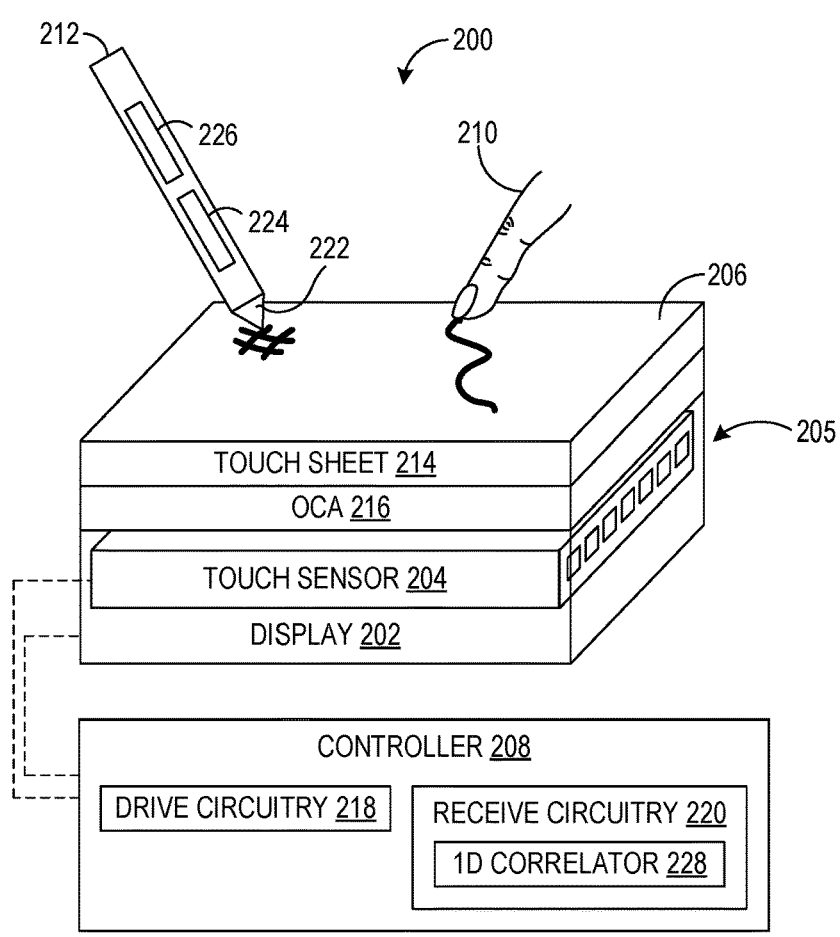
FIG. 2 shows an example touch-sensitive display device.

FIG. 2 shows an example touch-sensitive display device 200, which includes a display 202 and a touch sensor 204 to respectively enable the output of graphical content and reception of input. Display 202 is operable to emit light in an upward direction through display device 200, such that perceptible images can be formed at a top surface 206 of the display device or at other apparent location(s). For example, display 202 may assume the form of a liquid crystal display (LCD), organic light-emitting diode display (OLED), or any other suitable display. To effect display operation, FIG. 2 shows display 202 operatively coupled to a controller 208, which may control pixel operation, refresh rate, drive electronics, operation of a backlight if included, and/or other aspects of the display. A suitable image source, which may be integrated with, or provided separately from, controller 208, may provide graphical content for output by display 202. The image source may be a computing device external to, or integrated within, display device 200, for example.

Touch sensor 204 is operable to receive input, which may assume various suitable form(s). As examples, touch sensor 204 may detect (1) touch input applied by a human finger 210 in contact with top surface 206 of display device 200; (2) a force and/or pressure applied by the finger 210 to the top surface 206; (3) hover input applied by the finger 210 proximate to but not in contact with top surface 206; (4) a height of the hovering finger 210 from the top surface 206, such that a substantially continuous range of heights from the top surface 206 can be determined; and/or (5) input from a non-finger touch source, such as an active stylus 212. As described in further detail below, touch sensor 204 may receive position, tip force, button state, and/or other information from stylus 212, and in some examples, may transmit information to the stylus. Touch sensor 204 may be operable to receive input from multiple input sources (e.g., digits, styluses, other input devices) simultaneously, in which case display device may be referred to as a "multi-touch" display device. To enable input reception, touch sensor 204 may be configured to detect changes associated with the capacitance of a plurality of electrodes 205 of the touch sensor 204, as described in further detail below.

Display device 200 may include other components in addition to display 202 and touch sensor 204. As an example, FIG. 2 shows the inclusion of an optically clear touch sheet 214 providing top surface 206 for receiving touch input as described above. Touch sheet 214 may be comprised of any suitable materials, such as glass or plastic. Further, an optically clear adhesive (OCA) 216 bonds a bottom surface of touch sheet 214 to a top surface of display 202. As used herein, "optically clear adhesive" refers to a class of adhesives that transmit substantially all (e.g., about 99%) of incident visible light. Alternatively or additionally, display device 200 may include any suitable components not shown in FIG. 2, including but not limited to various optical elements (e.g., lens, diffuser, diffractive optical element, waveguide, filter, polarizer).

FIG. 2 depicts the integration of touch sensor 204 within display 202 in a so-called "in-cell" touch sensor implementation. In this example, one or more components of display device 200 may be operated to perform both display output and input sensing functions. As a particular example, one or more physical/electrical structures may be used both for capacitive sensing and for applying a voltage to create the field in the liquid crystal material that rotates polarization to form a displayed image. Alternative or additional components of display device 200 may be employed for display and input sensing functions, however.

Touch inputs (and/or other information) received by touch sensor 204 can affect any suitable aspect of display 202 and/or a computing device connected to display device 200, and may include two or three-dimensional finger inputs and/or gestures. As an example, FIG. 2 depicts the output of graphical content by display 202 in spatial correspondence with paths traced out by finger 210 and stylus 212 proximate to top surface 206.

Other touch sensor configurations are possible. For example, touch sensor 204 may alternatively be implemented in a so-called "on-cell" configuration, in which the touch sensor is disposed directly on display 202. In an example on-cell configuration, touch sensing electrodes 205 may be arranged on a color filter substrate of display 202. Implementations in which touch sensor 204 is configured neither as an in-cell nor on-cell sensor are possible, however. In such implementations, an optically clear adhesive (OCA) may be interposed between display 202 and touch sensor 204, for example.

When configured as a capacitive sensor, touch sensor 204 may include a plurality of electrodes 205 that are selectively driven by drive circuitry 218. The plurality of electrodes 205 may assume a variety of suitable forms, including but not limited to (1) elongate traces, as in row/column electrode configurations, where the rows and columns are arranged at substantially perpendicular or oblique angles to one another; (2) substantially contiguous pads, as in mutual capacitance configurations in which the pads are arranged in a substantially common plane and partitioned into drive and receive electrode subsets, or as in in-cell or on-cell configurations;

(3) meshes; and (4) an array of isolated (e.g., planar and/or rectangular) electrodes each arranged at respective x/y locations, as in in-cell or on-cell configurations.

The controller 208 may be configured to control operation of the touch sensor 204 and the display 202. In particular, the controller 208 includes drive circuitry 218 and receive circuitry 220. To enable sensing of touch input, drive circuitry 220 is configured to selectively drive one or more electrodes 205 of the touch sensor 204 with one or more waveforms. One or more electrical characteristics (e.g., capacitance, voltage, charge) of the electrodes/sensels 205 influenced by such driving via drive circuitry 304 are monitored via receive circuitry 306 to perform input sensing. In one example, responsive output for a given sensel may be used in a correlation operation after charging of the sensel for an integer number of iterations in an integration period. Alternatively or additionally, the sensel may be continuously monitored during charging. In either case, self-capacitance of the plurality of sensels is measured for input sensing. While FIG. 2 shows controller 208 as effecting operation of both display 202 and touch sensor 204 (e.g., electrode drive/receive operation), separate display and touch sensor controllers may be provided.

Touch sensor 204 may be configured in various structural forms and for different modes of capacitive sensing. In a self-capacitance mode, the capacitance and/or other electrical properties (e.g., voltage, charge) between touch sensing electrodes 205 and ground may be measured by receive circuitry 220 to detect inputs. In other words, the changing conditions at the electrode itself are measured by receive circuitry 220, rather than in relation to another electrode in the capacitance measuring system.

In a mutual capacitance mode, the capacitance and/or other electrical properties between electrodes 205 of differing electrical state may be measured by receive circuitry 220 to detect inputs. When configured for mutual capacitance sensing, and similar to the above examples, touch sensor 204 may include a plurality of vertically separated row and column electrodes 205 that form capacitive, plate-like nodes at row/column intersections when the touch sensor is driven by drive circuitry 218. The capacitance and/or other electrical properties of the nodes can be measured by receive circuitry 220 to detect inputs.

In some scenarios, touch sensor 204 may identify the presence of an input source by driving at least a subset of electrodes 205 via drive circuitry 218, and analyzing output resulting from such driving at the same or different subset of electrodes 205 via receive circuitry 220. For mutual capacitance implementations, a drive signal (also referred to herein as an "excitation waveform") such as a time-varying voltage may be applied to a first subset of electrodes (e.g., "drive" electrodes), thus influencing an output signal at a second subset of electrodes (e.g., "receive" electrodes). The presence of an input source may then be ascertained by analyzing the output signal as described below.

For self-capacitance implementations, one or more electrode characteristics may be analyzed to identify the presence of an input source. Typically, this is implemented via driving an electrode 205 with a drive signal, and observing the electrical behavior with receive circuitry attached to the electrode 205. For example, charge accumulation at the electrodes 205 resulting from drive signal application can be analyzed to ascertain the presence of the input source. In these example methods, input sources of the types that influence measurable properties of electrodes can be identified, such as fingers/hands, which may affect electrode conditions by providing a capacitive path to ground for electromagnetic fields. Other methods may be used to identify different input source types, such as those with active electronics.

While it may be desirable to maximize sensing frequency by simultaneously measuring capacitance at each sensel, this could entail, in some settings, provision of significant processing and hardware resources. As such, partial-granularity, multiplexed approaches to self-capacitance measurement may be implemented to reduce the amount of receive circuitry 220 and/or its implementation cost and complexity. However, such approaches may limit time allocated to capacitance measurements in order to sustain high frame/refresh rates.

In both mutual and self-capacitance implementations, touch sensor 204 may employ a correlation-based approach in analyzing output signals to perform input detection, among other operations. In this approach, a given output signal may be correlated with one or more reference sequences using a suitable correlation operation (e.g., cross-correlation) to obtain correlated output with sufficient signal-to-noise ratio. The correlation operation may yield a correlation magnitude that can be compared to a threshold such that, if the correlation output meets or exceeds the threshold, receive circuitry 220 determines that an input source is present, and if the number falls below the threshold, receive circuitry 220 determines that an input source is not present. Threshold or magnitude-based approaches may also be used to ascertain distance between the touch sensor and a finger, stylus, etc.

As discussed above, receive circuitry 220 may include one-dimensional correlators 228 configured to correlate a stylus waveform received from the stylus 212 against a single reference waveform, at each symbol slot of a communication frame. For in-cell touch sensor configurations, the use of one-dimensional correlators may significantly simplify the design of the receive circuitry, since the touch sensor may have numerous (e.g., tens of thousands) receivers. On the other hand, for such an in-cell touch sensor configuration to support receiving 2-dimensional signals, each receiver would need to calculate 2 correlations at each symbol slot, effectively doubling the number of correlators used by the receive circuitry. Such a design would significantly increase the complexity and cost of the touch senor configuration. Although, in some implementations, one or more stylus waveforms may be correlated to one or more reference waveforms by the receive circuitry 220.

The stylus 212 includes an electrode tip 222 (and potentially additional electrodes) configured to capacitively couple with one or more electrodes 205 of the touch sensor 204. The stylus 212 is configured to electrostatically transmit and/or receive signals to/from touch sensor 204 via electrode tip 222. Stylus 212 includes receive circuitry 224 and transmit circuitry 226 operatively coupled to electrode tip 222. Receive circuitry 224 is configured to interpret a response on the electrode tip 222 when a waveform is driven on one or more electrodes 205 of the touch sensor 204 proximate to the stylus 212. Transmit circuitry 226 is configured to transmit one or more stylus waveforms to the touch sensor 204 via a capacitive coupling between the electrode tip 222 and one or more electrodes 205 of the touch-sensor 204.

Generally, communication between stylus 212 and touch sensor 204 can be used to (1) determine the location of the stylus relative to the touch sensor; (2) send/receive synchronization signals to establish/maintain a shared sense of time between the stylus and the touch sensor; (3) communicate state/status and other data between the stylus and digitizer such as identifiers, stylus button state, battery level, force determined in the stylus tip, firmware updates, encryption keys/information, time at which various events occur, etc. In addition to the electrostatic interaction discussed herein, in some settings a radio link may be employed between the stylus and the display.

As discussed in further detail below, such stylus information may be encoded in stylus waveforms, which may be configured according to a signal modulation scheme in which bits of stylus information are encoded into demodulation symbols distributed over a one-dimensional, non-uniform constellation. In the examples herein, the signal modulation scheme uses a one-dimensional constellation compatible with the one-dimensional correlators 228 of the receive circuitry 200. In other words, correlation magnitudes output by the one-dimensional correlators 228 can be mapped to all demodulation symbols of the one-dimensional, non-uniform constellation. This is not the case for multi-dimensional constellations. Moreover, because the one-dimensional constellation is non-uniform, more than two symbols may be individually recognizable within the constellation, and each demodulation symbol may encode multiple bits of stylus information. The demodulation symbols may be selected to populate symbol slots of a communication frame. In this way, the data rate of each communication frame may be increased relative to a signal modulation scheme that encodes one bit per demodulation symbol, such as a Binary Phase-Shift Keying (BPSK) signal modulation scheme.

Figure 3:
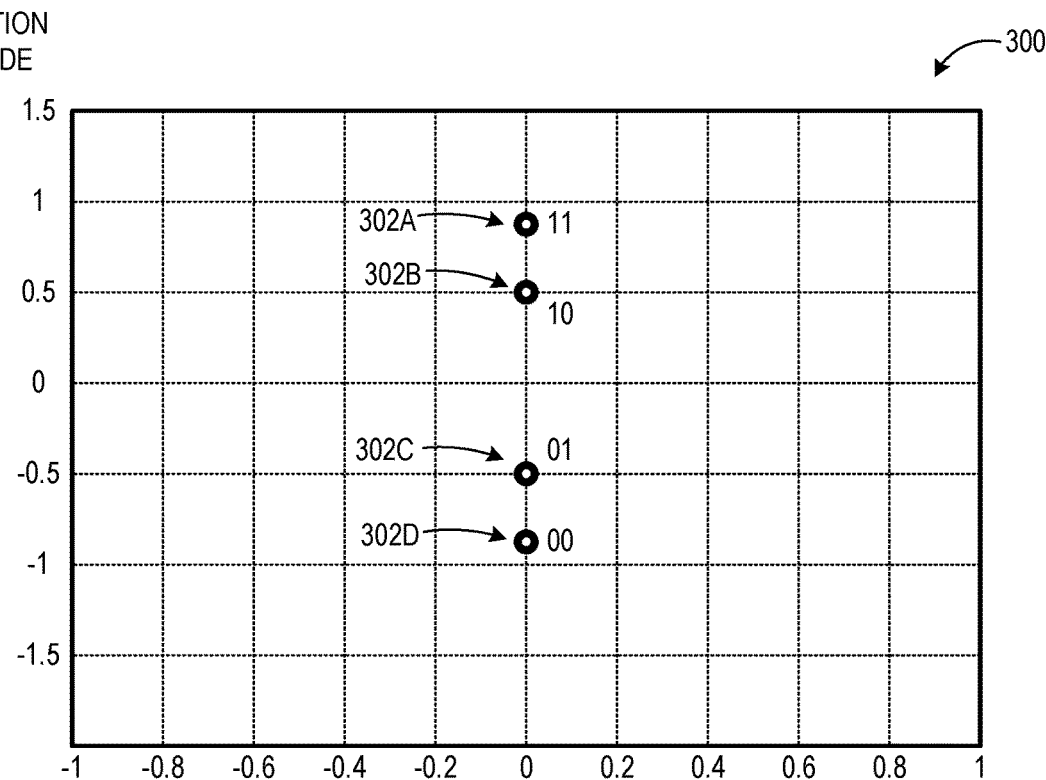
FIG. 3 shows an example one-dimensional non-uniform constellation of demodulation symbols.

FIG. 3 shows an example one-dimensional, non-uniform constellation 300 including a plurality of demodulation symbols 302 (e.g., 302A, 302B, 302C, 302D). Each demodulation symbol 302 maps to a different correlation magnitude and corresponds to a bit subset of a multi-bit encoding. In the depicted example, the constellation 300 includes four demodulation symbols that each encode two bits of data. In particular, demodulation symbol 302A maps to a normalized correlation magnitude of 0.9 and corresponds to the bit subset '11'; demodulation symbol 302B maps to a normalized correlation magnitude of 0.5 and corresponds to the bit subset '10'; demodulation symbol 302C maps to a normalized correlation magnitude of −0.5 and corresponds to the bit subset '01'; and demodulation symbol 302D maps to a normalized correlation magnitude of −0.9 and corresponds to the bit subset '00'. The constellation 300 is non-uniform, because not all demodulation symbols of the constellation are equidistant from each neighboring demodulation symbol. For example, demodulation symbol 302C is spaced apart from neighboring demodulation symbol 302D by a normalized magnitude of 0.4, and demodulation symbol 302C is spaced apart from the other neighboring demodulation symbol 302B by a normalized magnitude of 1.0. A non-uniform constellation may include any suitable constellation where not all demodulation symbols of the constellation are uniformly distributed.

Constellation 300 is provided as an example and is meant to be non-limiting. A one-dimensional, non-uniform constellation of the signal modulation scheme may include any suitable number of demodulation symbols that collectively encode any suitable number of bits of data. For example, a constellation may include eight symbols collectively encoding three bits of data, sixteen symbols collectively encoding four bits of data, thirty-two symbols collectively encoding five bits of data, and so on.

To encode bits of stylus information according to the signal modulation scheme, the transmit circuitry 226 of the stylus 212 is configured to modulate one or more characteristics of one or more stylus waveforms relative to one or more reference waveforms of the touch sensor 204. Such modulation affects one or more correlation magnitudes to be output by the one-dimensional correlators 228 of the receive circuitry 220, with these outputs being mapped to a demodulation symbol of the constellation 300. In one example, the amplitude of the one or more stylus waveforms is modulated or shifted relative to the one or more reference waveforms in order to effect correlation magnitudes that map to demodulation symbols. However, in some implementations, the stylus 212 may be configured to only support one bit of transmit voltage (e.g., either 0 or V). In other words, the stylus waveform may have a fixed pulse amplitude. In this case, the amplitude of the stylus waveforms cannot be modulated directly, and another characteristic of the one or more stylus waveforms may be varied instead. In one example, the stylus 212 varies the phase of the stylus waveforms in order to effect correlation magnitudes that map to demodulation symbols.

Figure 4:
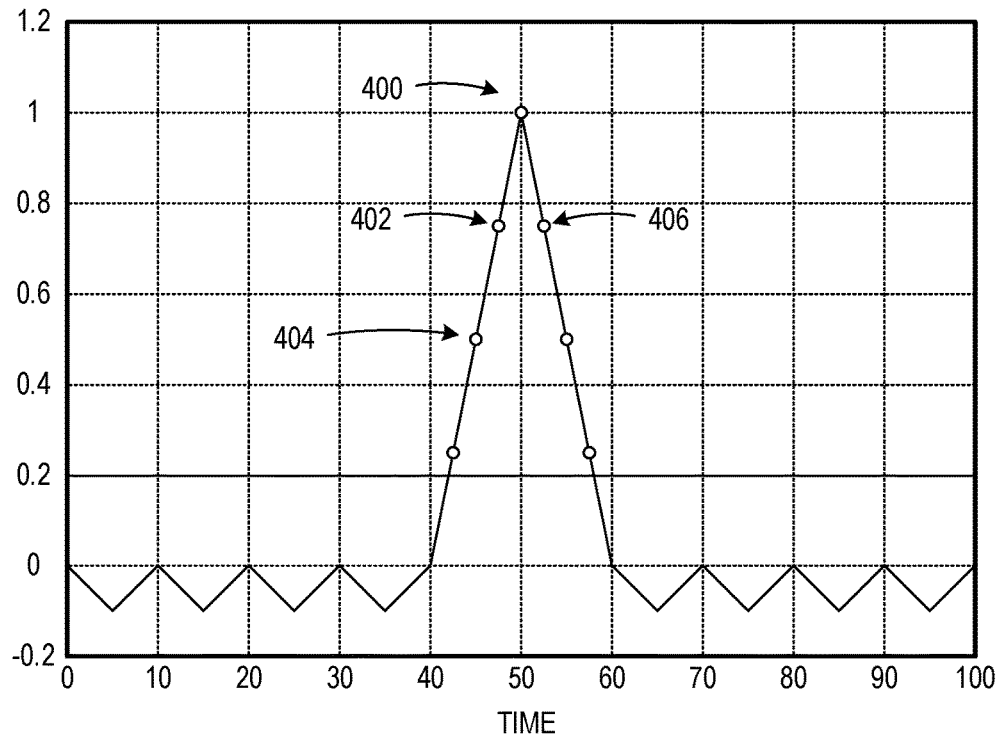
FIG. 4 shows an example variance in correlation magnitude based on modulation of a characteristic of a waveform.

As shown in FIG. 4, a correlation magnitude may be varied by shifting a phase of the stylus waveform. In particular, at 400, the reference waveform and the stylus waveform are precisely correlated to produce a normalized correlation magnitude of 1. If the stylus waveform is delayed by one microsecond, then the resulting amplitude of the stylus waveform received by the digitizer may decrease by 25% at 402. If the stylus waveform is delayed by two microseconds, then the resulting amplitude of the correlation magnitude output by the digitizer may decrease by 50% at 404. Likewise, if the phase of the stylus waveform is shifted forward by one microsecond, the resulting amplitude of the correlation magnitude output by the digitizer may decrease by 25% at 406, and so on. In this way, the amplitude of the correlation magnitude output from the receive circuitry 220 may be adjusted by shifting the phase of the reference waveform. Accordingly, the transmit circuitry 226 of the stylus 212 may be configured to generate one or more stylus waveforms by 1) calculating the phase required to produce a correlation magnitude that maps to each demodulation symbol that encodes bits of stylus information, and (2) send the one or more stylus waveform (e.g., sequence of pulses) with the calculated phase shift to the touch sensor 204.

Any suitable characteristic of the stylus waveform may be modulated to effect any suitable correlation magnitude to be output by the receive circuitry 220 that maps to any suitable demodulation symbol. Other non-limiting examples of modulated characteristics include a shifted frequency, a skipped pulse/cycle, and a truncation of the reference waveform. In another example, the stylus may generate an arbitrary stylus waveform or waveforms that affect symbol-mapped correlation magnitudes.

The correlation magnitude output by the receive circuitry 220 represents a signal component (e.g., the stylus waveform) plus a noise component. In some cases, a large noise component can move the intended signal away from a desired demodulation symbol toward another demodulation symbol on the constellation. If the noise pushes the correlation magnitude far enough, then a decode error may occur in which the stylus signal is mapped to an incorrect demodulation symbol. For example, referring to FIG. 3, a stylus signal that is intended to cause a normalized correlation magnitude of −0.9 to be output and mapped to demodulation symbol 302D may be skewed upward by signal noise to a normalized correlation magnitude of −0.5. This results in a decode error in which the stylus signal is mapped to the demodulation symbol 302C instead of 302D as intended.

In some implementations, the signal modulation scheme may be configured to reduce the negative effects of decode errors by placing higher priority data bits of stylus information in bit positions that are less vulnerable to decode errors. Referring to FIG. 3, the difference in magnitude (e.g., a magnitude of 1) between the upper cluster of demodulation symbols 302A and 302B and the lower cluster of demodulation symbols 302C and 302D is greater than the difference in magnitude between two demodulation symbols within a particular cluster (e.g., 0.4). As such, it is more difficult for noise to flip the most significant bit (MSB) than it is for noise to flip the least significant bit (LSB). Thus, the MSB positions are more robust than the LSB positions. To leverage this arrangement, the plurality of bits of stylus information may be encoded according to a designated priority in which higher priority bits are encoded in the MSB positions and lower priority bits are encoded in the LSB positions.

In one example, the stylus 212 transmits ten bits of touch force data to the touch sensor 204. It will be appreciated that not all of the ten bits of touch force data have the same level of significance. For example, any transmission error in MSBs of touch force data may be fairly noticeable to a user. In contrast, it may be much harder for a user to detect a difference caused by a decode error in the LSBs of the touch force data. According to one example signal modulation scheme, the ten bits of touch force data may be split into two groups (e.g., group one: five MSBs; group two: five LSBs), and each demodulation symbol represents two bits (e.g., one bit from group one, and one bit from group two). For example, bit ten and bit five of the touch force data are sent as a first demodulation symbol in a communication frame, bit nine and bit four are sent as a second demodulation symbol in the communication frame, and so on. In this way, the signal modulation scheme effectively lowers a signal-to-noise ratio (SNR) for the less important bits and tolerates a higher SNR for the more important bits. Such a signal modulation scheme may be more robust than a traditional ASK modulation that treats each bit equally.

Figure 5:
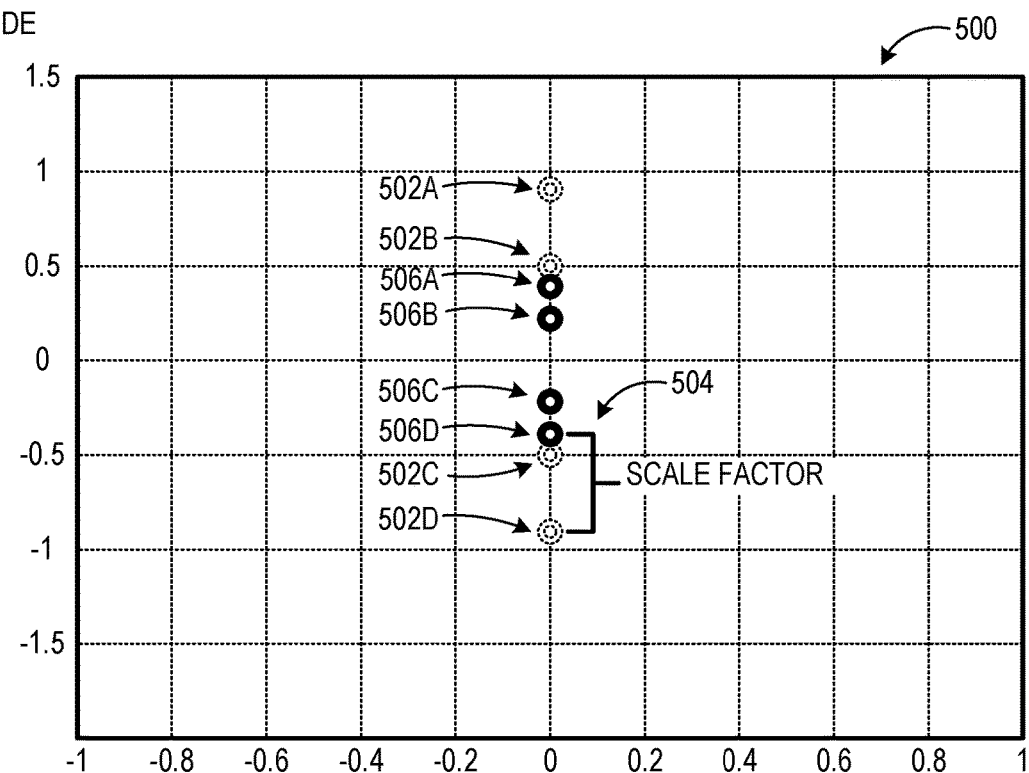
FIG. 5 shows an example one-dimensional non-uniform constellation of demodulation symbols adjusted by a scale factor to calibrate mapping of inbound signals to demodulation symbols.

In some implementations, the touch sensor 204 may be configured to compensate for the correlation magnitude by adjusting a plurality of threshold magnitude set points of the constellation that are used for mapping correlation magnitudes to demodulation symbols based on a scale factor. For example, as shown in FIG. 5, a constellation 500 includes demodulation symbols positioned based on a plurality of initial threshold magnitudes 502 (e.g., 502A, 502B, 502C, 502D). The touch sensor 204 may be configured to determine a scale factor 504. Further, the touch sensor 204 may be configured to adjust the plurality of initial threshold magnitudes 502 based on the scale factor 504 resulting in the demodulation symbols being positioned based on a plurality of updated threshold magnitudes 506 (e.g., 506A, 506B, 506C, 506D). When the threshold magnitudes are updated based on the scale factor 504, correlation magnitudes output by the receive circuitry 220 may be mapped to the demodulation symbols of the constellation 500 based on the updated threshold magnitudes. In this way, the received symbols may be demodulated accordingly.

In one example, a received signal may be written as: $r(k)=\alpha s(k)+n(k)$, where $\alpha$ is the unknown channel coefficient, $n(k)$ is the noise. When the noise is small, $\alpha$ can be estimated as $r(k)/s(k)$ (for example, for the reference symbol, $s(k)$ is known in advance (e.g., with largest magnitude for better SNR)).

The touch sensor 204 may be configured to determine the scale factor in any suitable manner. As used herein, "scale factor" can represent any mechanism for adjusting the mapping of correlation magnitudes to a demodulation constellation.

The scale factor may be determined/updated and/or the threshold magnitudes may be adjusted according to any suitable frequency. For example, the scale factor may be determined and/or the threshold magnitudes may be adjusted once per communication frame, multiple times per communication frame, one every designated number of communication frames, or according to another frequency. It will be appreciated that when the threshold magnitudes used for mapping are adjusted based on the scale factor, the threshold magnitudes may be used for subsequent mapping of correlation magnitudes to demodulation symbols until the threshold magnitudes are further adjusted based on an updated scale factor.

Figure 6:
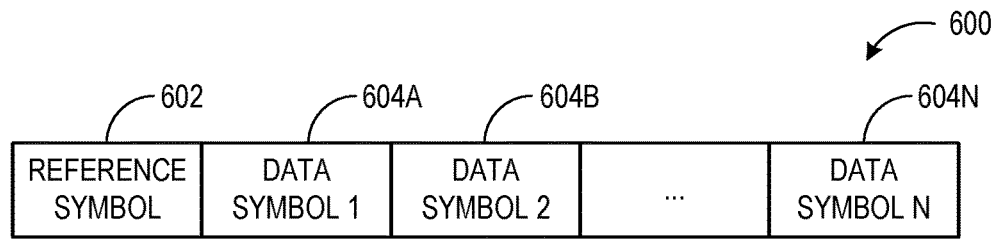
FIG. 6 shows an example data structure including a plurality of demodulation symbol slots.

In some implementations, the signal modulation scheme may stipulate that a communication frame includes a reference symbol slot during which the stylus waveform transmits a stylus waveform to effect an intended/known correlation magnitude that is analyzed by the receive circuitry 220 to determine the scale factor. As shown in FIG. 6, an example communication frame 600 includes a reference symbol slot 602 followed by a plurality of data symbol slots 604 (e.g., 604A, 604B, 604N). During the reference symbol slot 602, the stylus 212 transmits the stylus waveform (e.g., signal pulse) to effect the intended/known correlation magnitude. The receive circuitry 220 may learn the mapping between the actual correlation magnitude output and the intended/known demodulation symbol during the reference symbol slot 602. This mapping may be used to determine the scale factor for adjusting the threshold magnitudes of the constellation. For example, each threshold magnitude may be scaled by the scale factor estimated with the correlation magnitude from the reference symbol slot 602. In one example, as shown in FIG. 5, the initial threshold magnitude 502D may be used as the reference symbol. The intended/known magnitude for the reference symbol is −0.9. The actual magnitude of the received reference symbol is −0.4. In this example, the scale factor 504 is determined to be 2.25 based on the ratio between the intended magnitude and the actual magnitude. As such, all the threshold magnitudes of the constellation 500 are scaled by a factor of 1/2.25. In this way, the correlation magnitudes received during the data symbol slots of the communication frame can be mapped to the demodulation symbols of the constellation.

It will be appreciated that the reference symbol slot 602 may positioned at any suitable slot position within the communication frame 600. This is because the correlation magnitudes received during the different data symbol slots 604 may be mapped to demodulation symbols at the conclusion of the communication frame 600 after the threshold magnitudes have been adjusted based on the scale factor.

In some implementations, the reference symbol slot 602 may not be included in every communication frame. For example, the threshold magnitudes of the constellation may be adjusted based on the reference symbol every ten communication frames, or according to another frequency.

In some implementations, the receive circuitry 220 may be configured to determine the scale factor based on an absolute value of the reference correlation magnitude received during the reference symbol slot 602. In such implementations, the stylus 212 may send a signal pulse that produces either a positive or negative reference correlation magnitude to provide an additional bit of stylus information. The receive circuitry 220 may be configured to decode the additional bit of stylus information based on the mathematical sign (e.g., positive '+,' negative '−') of the reference correlation magnitude received during the reference symbol slot 602. The additional bit may indicate any suitable stylus information. In one example, the additional bit indicates a state of a push button of the stylus.

In some implementations, the communication frame may include multiple reference symbol slots. For example, the scale factor may be determined for the entire frame based on an average level of correlation magnitudes received during the multiple reference symbol slots, or for individual time slices based on interpolations between received reference levels. In other examples, the scale factor may be determined differently based on reference correlation magnitudes received during the multiple reference symbol slots. The multiple reference symbol slots may be positioned at any suitable slot position within the communication frame.

Figure 7:
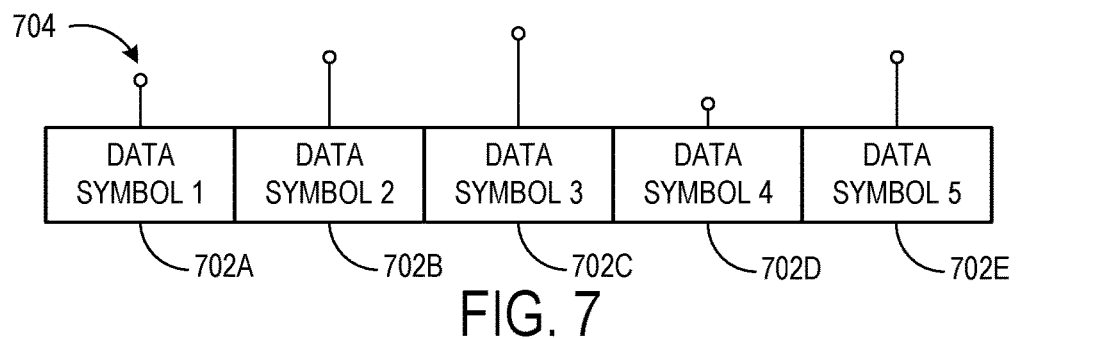
FIG. 7 shows another example data structure including a plurality demodulation symbol slots.

In some implementations, the signal modulation scheme may stipulate that a communication frame includes no reference symbol slots, and instead the scale factor may be determined based on interpolation of correlation magnitude received during data symbol slots of the communication frame. As shown in FIG. 7, an example communication frame 700 includes a plurality of data symbol slots 702 (e.g., 702A, 702B, 702C, 702D, 702E). Receive circuitry 220 may be configured to output a correlation magnitude 704 corresponding to a stylus waveform received during each data symbol slot 702. In some implementations, the receive circuitry 220 is configured to determine the scale factor based on average of the plurality of correlation magnitudes. In other implementations, the receive circuitry 220 may be configured to identify an upper reference correlation magnitude (e.g., the highest correlation magnitude of the plurality of correlation magnitudes 704) and a lower reference correlation magnitude (e.g., the lowest correlation magnitude of the plurality of correlation magnitudes 704). The receive circuitry 200 may be configured to determine the scale factor based on an interpolation between the upper reference correlation magnitude and the lower reference correlation magnitude.

The receive circuitry 220 may be configured to determine the scale factor in any suitable manner. In some implementations, all threshold magnitudes may be adjusted based on the same scale factor. In other implementations, each threshold magnitude may be adjusted based on a different scale factor. For example, in implementations where the scale factor is interpolated based on highest and lowest reference correlation magnitudes, the scale factor for a particular threshold magnitude may depend on where the correlation magnitude is in relation to the upper or lower reference magnitudes. In another example, the scale factor may be updated iteratively each time a correlation magnitude is received during a data symbol slot.

In some implementations, the receive circuitry 220 may be configured to make logical assumptions about selecting particular demodulation symbols to map to correlation magnitudes based on previous mappings. For example, within a communication frame a reference correlation magnitude or other identified data correlation magnitude may be used to identify or exclude other demodulation symbols for mapping purposes. In other words, receive circuitry may be configured to, upon mapping at least one correlation magnitude to a demodulation symbol, exclude one or more other demodulation symbols from being selected for mapping to other correlation magnitudes of the plurality of correlation magnitudes.

Figure 8:
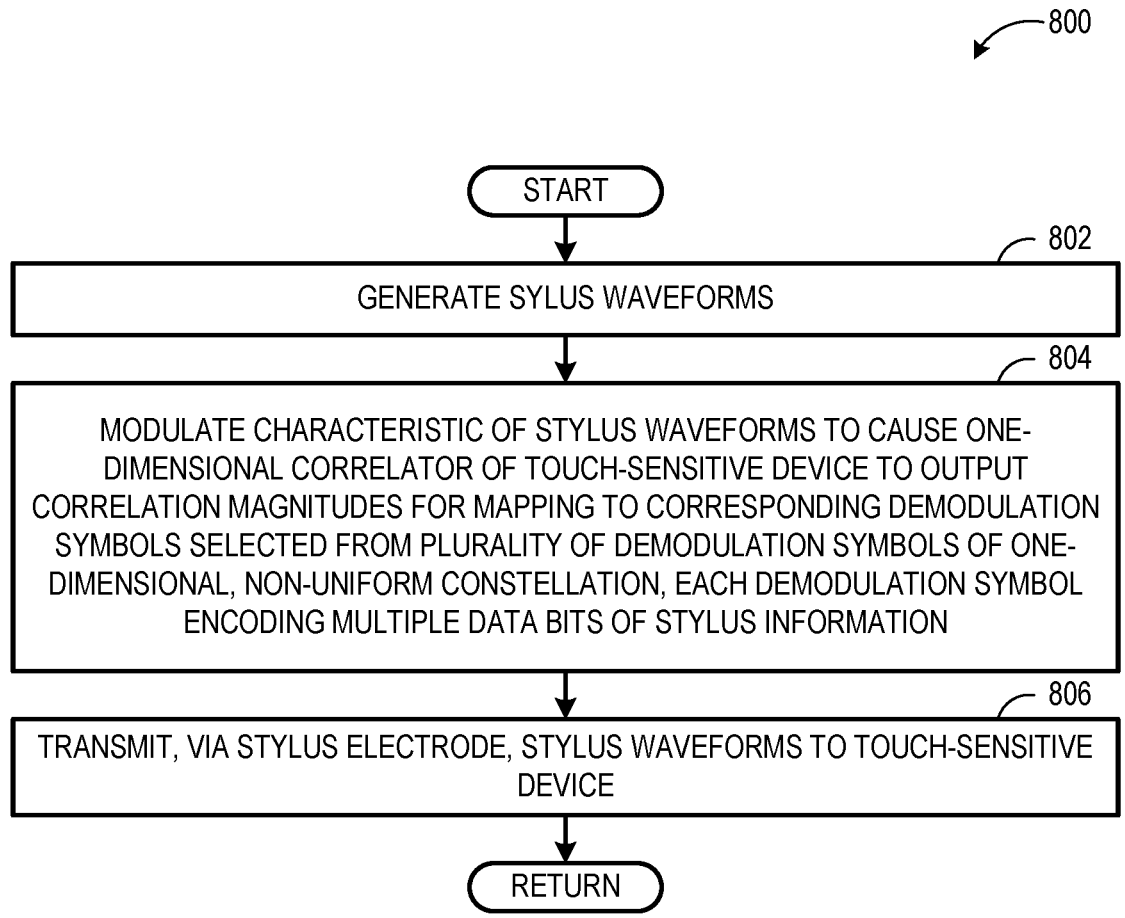
FIG. 8 shows an example electrostatic communication method for an active stylus.

FIG. 8 shows an example electrostatic communication method 800 that may be performed by an active stylus to transmit stylus information to a touch-sensitive device. For example, the method 800 may be performed by the active stylus 108 of FIG. 1 or the active stylus 212 of FIG. 2. At 802, the method 800 includes generating stylus waveforms. At 804, the method 800 includes modulating a characteristic of the stylus waveforms to cause a one-dimensional correlator of the touch-sensitive device to output correlation magnitudes for mapping to corresponding demodulation symbols selected from a plurality of demodulation symbols of a one-dimensional, non-uniform constellation. Each demodulation symbol encodes multiple data bits of stylus information. At 806, the method 800 includes transmitting, via the stylus electrode, the modulated stylus waveforms to the touch-sensitive device.

Figure 9:
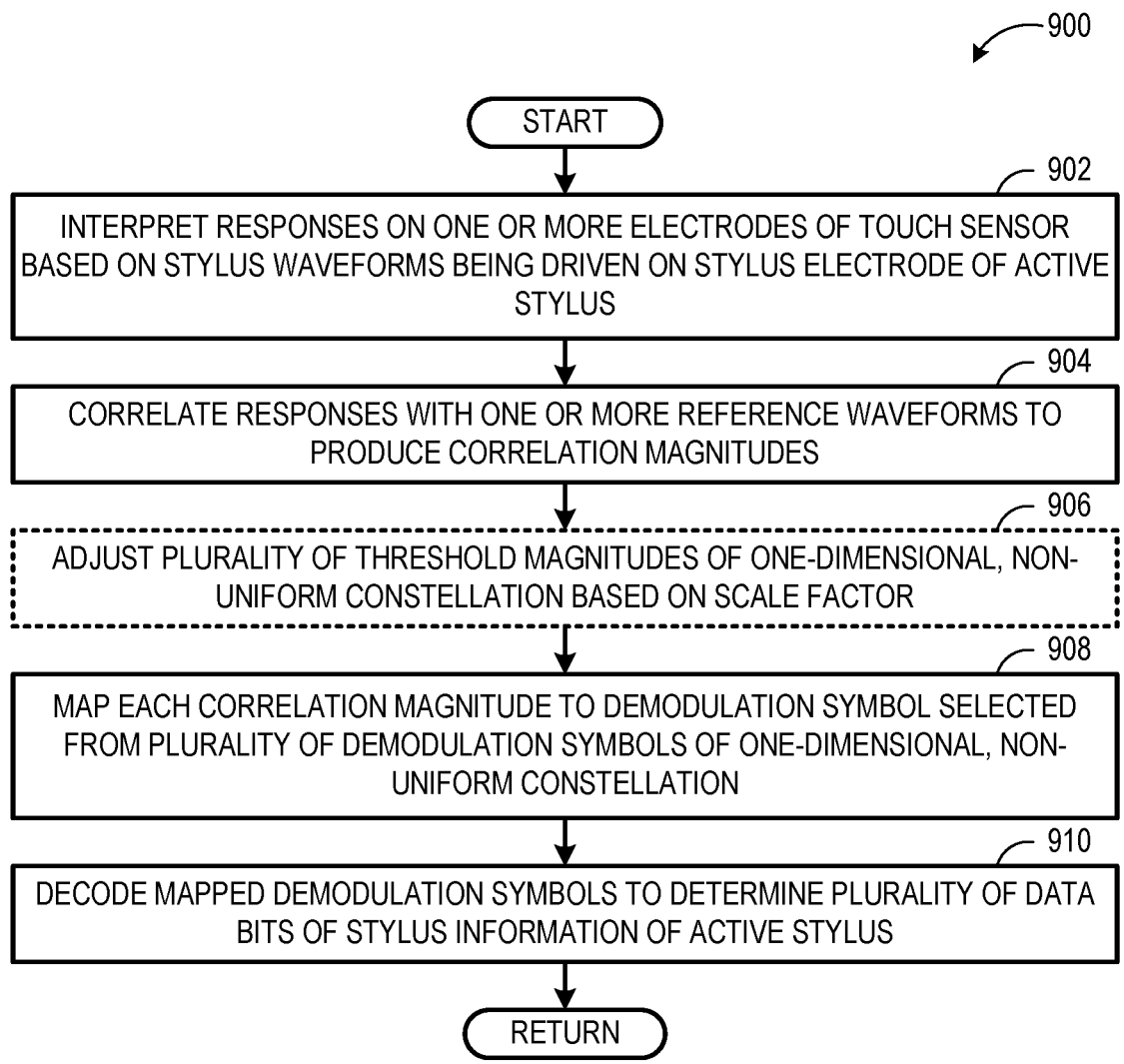
FIG. 9 shows an example electrostatic communication method for a touch-sensitive device.

FIG. 9 shows an example electrostatic communication method 900 for a touch-sensitive device to receive stylus information from an active stylus. For example, the method 900 may be performed by a touch-sensitive display system 100 of FIG. 1 or the touch-sensitive display device 200 of FIG. 2. At 902, the method 900 includes interpreting responses on one or more electrodes of the plurality of electrodes based on stylus waveforms being driven on a stylus electrode of an active stylus. At 904, the method 900 includes correlating the responses with one or more reference waveforms to produce correlation magnitudes.

In some implementations, at 906, the method 900 optionally may include adjusting a plurality of threshold magnitudes of a one-dimensional, non-uniform constellation based on a scale factor. For example, the scale factor may be determined based on one or more of the correlation magnitudes as discussed above.

At 908, the method 900 includes mapping each correlation magnitude to a demodulation symbol selected from a plurality of demodulation symbols of the one-dimensional, non-uniform constellation. If the threshold magnitudes of the constellation are adjusted based on the scale factor, then the mapping may be based on the updated threshold magnitudes. Otherwise, the mapping may be based on the initial threshold magnitudes set for the constellation.

At 910, the method 900 includes decoding the mapped demodulation symbols to determine a plurality of data bits of stylus information of the active stylus.

According to the above described methods, by encoding multiple data bits of stylus information into each demodulation symbol, data rates of communication frames used to communicate stylus information may be increased.

In some implementations, the methods and processes described herein may be tied to a computing system of one or more computing devices. In particular, such methods and processes may be implemented as a computer-application program or service, an application-programming interface (API), a library, and/or other computer-program product.

Figure 10:
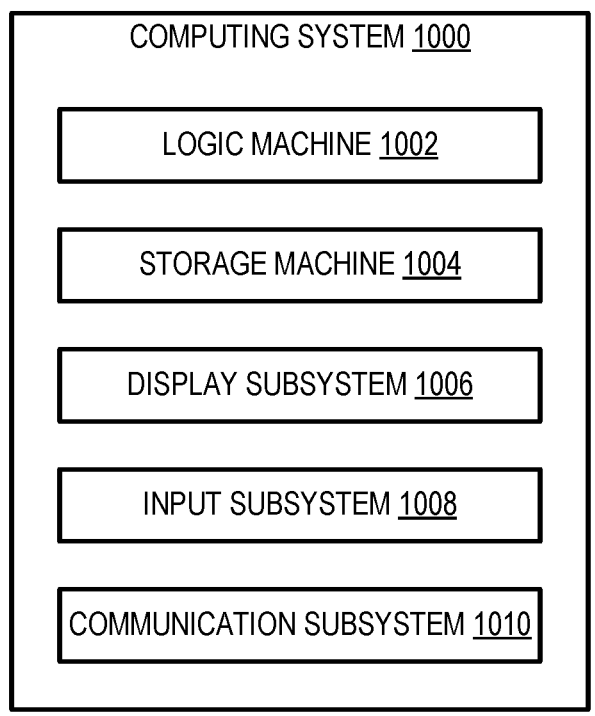
FIG. 10 shows an example computing system.

FIG. 10 schematically shows a non-limiting example of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices. For example, computing system 1000 may represent interactive display system 100, touch-sensitive display device 200, and in general any suitable touch-sensitive device discussed herein.

Computing system 1000 includes a logic machine 1002 and a storage machine 1004. Computing system 1000 may optionally include a display subsystem 1006, input subsystem 1008, communication subsystem 1010, and/or other components not shown in FIG. 10.

Logic machine 1002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 1002 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1004 includes one or more physical devices configured to hold instructions executable by the logic machine to implement the methods and processes described herein. When such methods and processes are implemented, the state of storage machine 1004 may be transformed—e.g., to hold different data.

Storage machine 1004 may include removable and/or built-in devices. Storage machine 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1004 may include volatile, nonvolatile, dynamic, static, read/write, read-only, random-access, sequential-access, location-addressable, file-addressable, and/or content-addressable devices.

It will be appreciated that storage machine 1004 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1002 and storage machine 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1006 may be used to present a visual representation of data held by storage machine 1004. This visual representation may take the form of a graphical user interface (GUI). As the herein described methods and processes change the data held by the storage machine, and thus transform the state of the storage machine, the state of display subsystem 1006 may likewise be transformed to visually represent changes in the underlying data. Display subsystem 1006 may include one or more display devices utilizing virtually any type of technology. Such display devices may be combined with logic machine 1002 and/or storage machine 1004 in a shared enclosure, or such display devices may be peripheral display devices.

When included, input subsystem 1008 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem 1010 may be configured for communication via a wireless telephone network, or a wired or wireless local- or wide-area network. In some implementations, the communication subsystem 1010 may allow computing system 1000 to send and/or receive messages to and/or from other devices via a network such as the Internet.

In an example, a touch-sensitive device comprises a touch sensor including a plurality of electrodes, receive circuitry configured to interpret responses on one or more electrodes of the plurality of electrodes based on stylus waveforms being driven on a stylus electrode of an active stylus, and where the touch-sensitive device is configured to 1) correlate the responses with one or more reference waveforms to produce correlation magnitudes; 2) map each correlation magnitude to a demodulation symbol selected from a plurality of demodulation symbols of a one-dimensional, non-uniform constellation, each demodulation symbol encoding multiple data bits; and 3) decode the mapped demodulation symbols to determine a plurality of data bits of stylus information of the active stylus. In this example and/or other examples, the receive circuitry may include a one-dimensional correlator, and a characteristic of the stylus waveform may be modulated to effect the correlation magnitudes output by the one-dimensional correlator. In this example and/or other examples, the modulated characteristic may include at least one of a shifted phase, a shifted frequency, a skipped pulse, and a truncation of the stylus waveforms. In this example and/or other examples, the stylus waveform may have a fixed pulse amplitude. In this example and/or other examples, the plurality of data bits of stylus information may be encoded according to a designated priority in which higher priority bits are encoded as most significant bits of the multiple bits of the mapped demodulation symbols. In this example and/or other examples, the touch-sensitive device may be configured to adjust a plurality of threshold magnitudes of the constellation that are used for mapping the correlation magnitudes to the demodulation symbols based on a scale factor. In this example and/or other examples, the scale factor may be based on a reference correlation magnitude of the correlation magnitudes. In this example and/or other examples, the touch-sensitive device may be configured to map an absolute value of the reference correlation magnitude to a corresponding demodulation symbol selected from the plurality of demodulation symbols, and the touch-sensitive device may be configured to decode an additional bit of stylus information based on a mathematical sign of the reference correlation magnitude. In this example and/or other examples, the scale factor may be based on an average of the correlation magnitudes. In this example and/or other examples, the scale factor may be based on an interpolation between an upper reference correlation magnitude and a lower reference correlation magnitude of the correlation magnitudes. In this example and/or other examples, the touch-sensitive device may be configured to, upon mapping at least one of the correlation magnitudes to a demodulation symbol, exclude one or more other demodulation symbols from being selected for mapping to other correlation magnitudes.

In an example, an electrostatic communication method for a touch-sensitive device including a touch sensor including a plurality of electrodes comprises interpreting responses on one or more electrodes of the plurality of electrodes based on stylus waveforms being driven on a stylus electrode of an active stylus, correlating the responses with one or more reference waveforms to produce correlation magnitudes, mapping each correlation magnitude to a demodulation symbol selected from a plurality of demodulation symbols of a one-dimensional, non-uniform constellation, each demodulation symbol encoding multiple data bits, and decoding the mapped demodulation symbols to determine a plurality of data bits of stylus information of the active stylus. In this example and/or other examples, a characteristic of the one or more stylus waveforms may be modulated to effect the correlation magnitudes to be output by a one-dimensional correlator of the touch-sensitive device, the modulated characteristic may include at least one of a shifted phase, a shifted frequency, a skipped pulse, and a truncation of the stylus waveforms, and the stylus waveform may have a fixed pulse amplitude. In this example and/or other examples, the method may further comprise adjusting a plurality of threshold magnitudes of the constellation that are used for mapping the correlation magnitudes to the demodulation symbols based on a scale factor. In this example and/or other examples, the scale factor may be based on at least one of a reference correlation magnitude of the correlation magnitudes, an average of the correlation magnitudes, and an interpolation between an upper reference correlation magnitude and a lower reference correlation magnitude of the correlation magnitudes. In this example and/or other examples, the scale factor may be based on a reference correlation magnitude of the correlation magnitudes, an absolute value of the reference correlation magnitude is mapped to a demodulation symbol selected from the plurality of demodulation symbols, and an additional bit of stylus information is decoded based on a mathematical sign of the reference correlation magnitude.

In an example, an active stylus comprises a stylus electrode configured to capacitively couple with one or more electrodes of a touch sensor of a touch-sensitive device, and transmit circuitry operatively coupled to the stylus electrode and configured to 1) generate stylus waveforms; 2) modulate a characteristic of the stylus waveforms to cause a one-dimensional correlator of the touch-sensitive device to output correlation magnitudes for mapping to corresponding demodulation symbol selected from a plurality of demodulation symbols of a one-dimensional, non-uniform constellation, each demodulation symbol encoding multiple data bits, and 3) transmit, via the stylus electrode, the modulated stylus waveforms to the touch-sensitive device. In this example and/or other examples, the modulated characteristic may include at least one of a shifted phase, a shifted frequency, a skipped pulse, and a truncation of the stylus waveforms. In this example and/or other examples, the stylus electrode may be configured to transmit the stylus waveforms with a fixed pulse amplitude. In this example and/or other examples, data bits may be encoded according to a designated priority in which higher priority bits are encoded as most significant bits by the demodulation symbols.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A touch-sensitive device, comprising:
a touch sensor including a plurality of electrodes;
receive circuitry configured to interpret responses on one or more electrodes of the plurality of electrodes based on stylus waveforms being driven on a stylus electrode of an active stylus; and
where the touch-sensitive device is configured to 1) correlate the responses with one or more reference waveforms to produce a plurality of different correlation magnitudes; 2) map each correlation magnitude of the plurality of different correlation magnitudes to a different demodulation symbol selected from a plurality of demodulation symbols of a one-dimensional, non-uniform constellation, each demodulation symbol encoding a different bit subset of multiple data bits; and 3) decode the mapped demodulation symbols to determine a plurality of data bits of stylus information of the active stylus.

2. The touch-sensitive device of claim 1, where the receive circuitry includes a one-dimensional correlator, and where a characteristic of the stylus waveforms is modulated to effect the correlation magnitudes output by the one-dimensional correlator.

3. The touch-sensitive device of claim 2, where the modulated characteristic includes at least one of a shifted phase, a shifted frequency, a skipped pulse, and a truncation of the stylus waveforms.

4. The touch-sensitive device of claim 3, where the stylus waveform has a fixed pulse amplitude.

5. The touch-sensitive device of claim 1, where the plurality of data bits of stylus information are encoded according to a designated priority in which higher priority bits are encoded as most significant bits of the multiple bits of the mapped demodulation symbols.

6. The touch-sensitive device of claim 1, where the touch-sensitive device is configured to adjust a plurality of threshold magnitudes of the constellation that are used for mapping the correlation magnitudes to the demodulation symbols based on a scale factor.

7. The touch-sensitive device of claim 6, where the scale factor is based on a reference correlation magnitude of the correlation magnitudes.

8. The touch-sensitive device of claim 7, where the touch-sensitive device is configured to map an absolute value of the reference correlation magnitude to a corresponding demodulation symbol selected from the plurality of demodulation symbols, and where the touch-sensitive device is configured to decode an additional bit of stylus information based on a mathematical sign of the reference correlation magnitude.

9. The touch-sensitive device of claim 6, where the scale factor is based on an average of the correlation magnitudes.

10. The touch-sensitive device of claim 6, where the scale factor is based on an interpolation between an upper reference correlation magnitude and a lower reference correlation magnitude of the correlation magnitudes.

11. The touch-sensitive device of claim 1, where the touch-sensitive device is configured to, upon mapping at least one of the correlation magnitudes to a demodulation symbol, exclude one or more other demodulation symbols from being selected for mapping to other correlation magnitudes.

12. An electrostatic communication method for a touch-sensitive device including a touch sensor including a plurality of electrodes, the method comprising:
   interpreting responses on one or more electrodes of the plurality of electrodes based on stylus waveforms being driven on a stylus electrode of an active stylus;
   correlating the responses with one or more reference waveforms to produce a plurality of different correlation magnitudes;
   mapping each correlation magnitude of the plurality of different correlation magnitudes to a different demodulation symbol selected from a plurality of demodulation symbols of a one-dimensional, non-uniform constellation, each demodulation symbol encoding a different bit subset of multiple data bits; and
   decoding the mapped demodulation symbols to determine a plurality of data bits of stylus information of the active stylus.

13. The electrostatic communication method of claim 12, where a characteristic of the one or more stylus waveforms is modulated to effect the correlation magnitudes to be output by a one-dimensional correlator of the touch-sensitive device, where the modulated characteristic includes at least one of a shifted phase, a shifted frequency, a skipped pulse, and a truncation of the stylus waveforms, and where the stylus waveform has a fixed pulse amplitude.

14. The electrostatic communication method of claim 12, further comprising: adjusting a plurality of threshold magnitudes of the constellation that are used for mapping the correlation magnitudes to the demodulation symbols based on a scale factor.

15. The electrostatic communication method of claim 14, where the scale factor is based on at least one of a reference correlation magnitude of the correlation magnitudes, an average of the correlation magnitudes, and an interpolation between an upper reference correlation magnitude and a lower reference correlation magnitude of the correlation magnitudes.

16. The electrostatic communication method of claim 14, where the scale factor is based on a reference correlation magnitude of the correlation magnitudes, where an absolute value of the reference correlation magnitude is mapped to a demodulation symbol selected from the plurality of demodulation symbols, and where an additional bit of stylus information is decoded based on a mathematical sign of the reference correlation magnitude.

17. An active stylus, comprising:
   a stylus electrode configured to capacitively couple with one or more electrodes of a touch sensor of a touch-sensitive device; and
   transmit circuitry operatively coupled to the stylus electrode and configured to 1) generate stylus waveforms; 2) modulate a characteristic of the stylus waveforms to cause a one-dimensional correlator of the touch-sensitive device to output a plurality of different correlation magnitudes for mapping to corresponding different demodulation symbols selected from a plurality of demodulation symbols of a one-dimensional, non-uniform constellation, each demodulation symbol encoding a different subset of multiple data bits, and 3) transmit, via the stylus electrode, the modulated stylus waveforms to the touch-sensitive device.

18. The active stylus of claim 17, where the modulated characteristic includes at least one of a shifted phase, a shifted frequency, a skipped pulse, and a truncation of the stylus waveforms.

19. The active stylus of claim 18, where the stylus electrode is configured to transmit the stylus waveforms with a fixed pulse amplitude.

20. The active stylus of claim 17, where data bits are encoded according to a designated priority in which higher priority bits are encoded as most significant bits by the demodulation symbols.

* * * * *